United States Patent [19]
Hollander

[11] Patent Number: 5,634,135
[45] Date of Patent: May 27, 1997

[54] MICROPROCESSOR WITH PRIORITY DETERMINATION AND PRIORITY BASED INSTRUCTION SELECTION

[75] Inventor: James F. Hollander, Dallas, Tex.

[73] Assignee: Texas Instruments Incorporated, Dallas, Tex.

[21] Appl. No.: 813,314

[22] Filed: Dec. 13, 1991

[51] Int. Cl.$^6$ ............................ G06F 9/30; G06F 9/38; G06F 9/46
[52] U.S. Cl. ........................ 395/800; 395/478; 395/381; 364/DIG. 1; 364/DIG. 2
[58] Field of Search ........................ 395/800, 200, 395/325, 550, 400, 425, 375, 250, 275, 650, 500, 575, 200.15, 485, 737, 478, 725; 364/DIG. 1, DIG. 2

[56] References Cited

U.S. PATENT DOCUMENTS

| | | | |
|---|---|---|---|
| 4,041,617 | 8/1977 | Hollander | 35/22 |
| 4,402,042 | 8/1983 | Guttag | 364/200 |
| 4,432,052 | 2/1984 | McDonough et al. | 364/200 |
| 4,435,763 | 3/1984 | Bellay et al. | 364/200 |
| 4,471,426 | 9/1984 | McDonough | 364/200 |
| 4,562,537 | 12/1985 | Barnett et al. | 364/200 |
| 4,577,282 | 3/1986 | Caudel et al. | 364/200 |
| 4,680,701 | 7/1987 | Cochran | 364/200 |
| 4,814,970 | 3/1989 | Barbagelata et al. | 364/200 |
| 4,912,636 | 3/1990 | Magar et al. | 364/200 |
| 4,933,878 | 6/1990 | Guttag et al. | 364/521 |
| 4,985,824 | 1/1991 | Husseiny et al. | 364/187 |
| 4,989,133 | 1/1991 | May et al. | 395/550 |
| 5,012,430 | 4/1991 | Sakurai | 364/513 |
| 5,072,418 | 12/1991 | Boutaud et al. | 364/715.06 |
| 5,203,002 | 4/1993 | Wetzel | 395/800 |

*Primary Examiner*—Daniel H. Pan
*Attorney, Agent, or Firm*—Gerald E. Laws; C. Alan McClure; Richard L. Donaldson

[57] ABSTRACT

A processor architecture comprises a priority processing unit (20), a priority memory (30), an instruction set memory (40), and an instruction execution unit (50). The priority processing unit (20) generates priority values and stores them in priority memory (30). Each priority value is associated with an instruction stored in instruction memory (40). Priority processing unit (20) causes the instruction associated with a particular priority value to be outputted to instruction execution unit (50).

28 Claims, 3 Drawing Sheets

MICROPROCESSOR WITH PRIORITY DETERMINATION AND PRIORITY BASED INSTRUCTION SELECTION

TECHNICAL FIELD OF THE INVENTION

This invention relates generally to the field of microprocessors, and more specifically to microprocessor instruction selection architecture.

BACKGROUND OF THE INVENTION

Without limiting the scope of the invention, its background is described in connection with microcontrollers and microprocessors.

In recent years, microprocessor- (or microcontroller-) based systems have been applied to almost every area of our lives. From automobiles to personal computers, and banking services to video games, microprocessor-based systems have proved to be flexible and useful.

Most microprocessor based systems are designed to sequentially process given sets of instructions. Typically, a microprocessor has a program counter to point to the next instruction to be processed, with the contents of the program counter determined either automatically or by execution of instructions (branch, call, return) that can alter the contents.

These conventional machines have proved useful in performing arithmetic and logical operations in step-by-step processing. The very strength of these conventional machines—the rigid and ordered processing of instructions—proves a limitation when what is desired is a system that mimics efficient and intuitive human handling of numerous competing tasks. As an analogy, take the situation of an office worker who has many projects and conflicting deadlines. Just as soon as a plan is made, another project may be assigned to the office worker, or it may suddenly be required that a project be completed immediately. Non-work related activities (such as eating, sleeping, and exercising), and emotional feelings also are taken into account. The efficient office worker deftly performs numerous tasks with clever timing and gets help as needed.

When an application for a microprocessor-based system requires responses similar to those of the efficient human worker, conventional machines do not present particularly compelling solutions. Parallel processing systems of SIMD and MIMD varieties, and fuzzy computers have been developed but further improvements and alternatives would be desirable.

SUMMARY OF THE INVENTION

In accordance with the present invention, a processor architecture is provided which comprises an instruction memory that contains instructions which can be executed by an instruction execution unit. A priority processing unit generates priority values to be assigned to each of the instructions. The priority values are stored in an instruction memory.

According to one specific embodiment of the present invention, instructions are executed according to their priorities, so that the instruction having the greatest priority will be processed at any given time.

According to another specific embodiment of the present invention, priority values are generated and associated with particular instructions in the instruction memory by the priority processing unit. The priority processing unit utilizes a priority program to generate priority values and to output them to a priority memory. The priority processing unit may base the determination of priority values solely on the priority program, or on information from other devices, such as timers or peripheral devices.

In still another embodiment of the present invention, a control parameter unit may be used to evaluate and control the efficiency of a system based on the architecture of the present invention.

An important technical advantage of the present invention is the fact that it uses a priority processing unit to assign priority values to each instruction capable of being processed, and determines which instruction is to be processed at any given time based upon those priority values. Use of the priority processing unit to determine which instruction is to be executed optimizes control of a system containing numerous competing processes.

BRIEF DESCRIPTION OF THE DRAWINGS

A more complete understanding of the present invention may be derived by referring to the detailed description and claims when considered in connection with the accompanying drawings, in which like reference numbers indicate like features, and wherein:

DETAILED DESCRIPTION OF THE PREFERRED EMBODIMENTS

Figure 1:
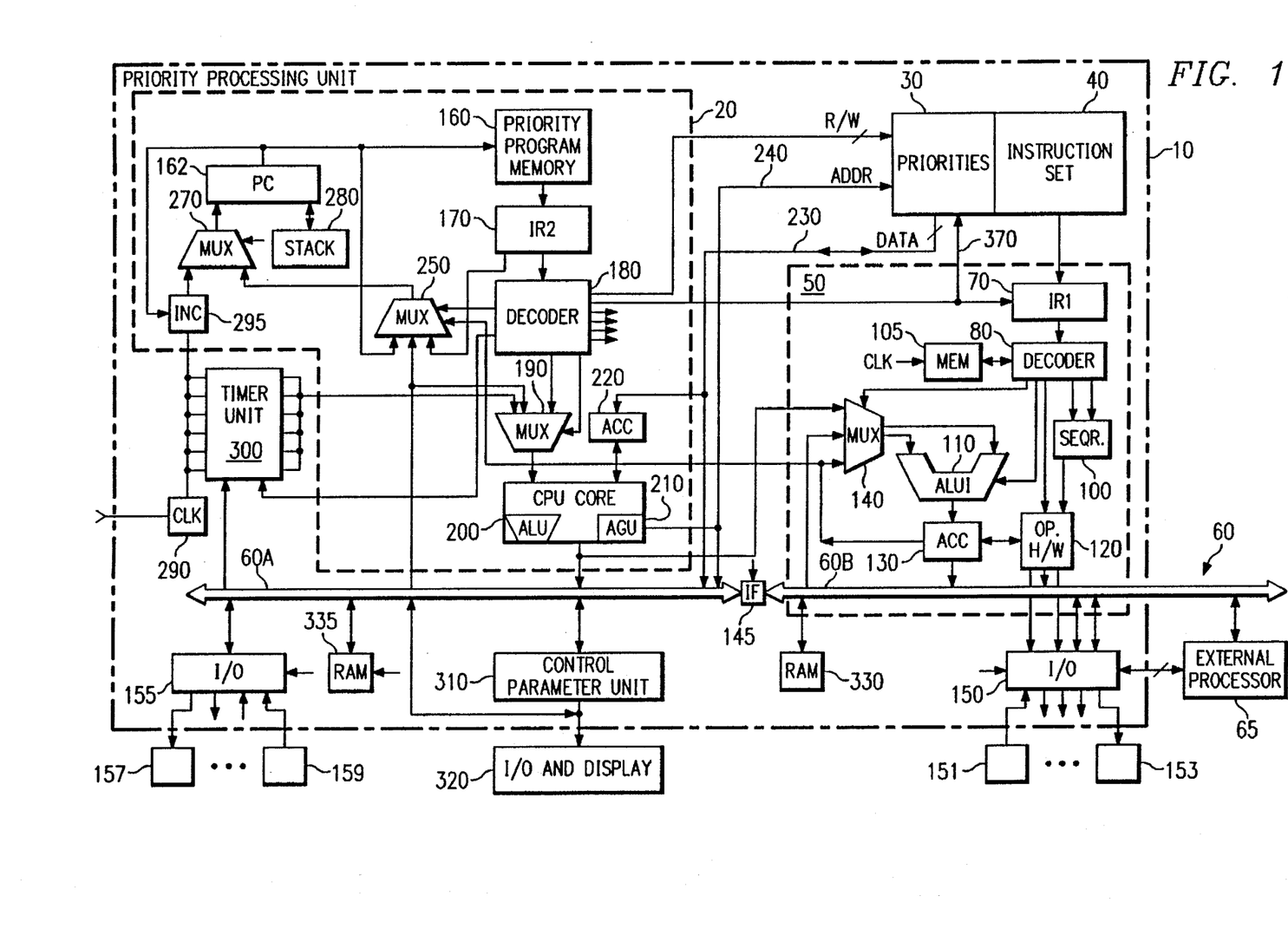
FIG. 1 is a block diagram of a processor using the architecture a preferred embodiment of the present invention.

Referring to FIG. 1, a processor 10 includes those components surrounded by the largest dashed enclosure, and itself includes a priority processing unit 20 coupled to a priority memory 30 and an instruction execution unit 50. Processor 10 further comprises an address and data bus 60 coupled to priority processing unit 20 and instruction execution unit 50. Priority memory 30 is coupled to instruction set memory 40 which in turn is coupled to instruction execution unit 50.

Priority processing unit 20 generates priority values and stores those values in priority memory 30. Instruction memory 40 holds all instructions that can be decoded and executed by instruction execution unit 50. Each instruction stored in instruction memory 40 has associated with it a memory location in priority memory 30. Each instruction in instruction memory 40 will therefore have associated with it a particular priority value at any given time, depending on the priority value stored in the memory location of priority memory 30 associated with that particular instruction. The instruction of instruction set memory 40 that has associated with it the highest priority value will (in the illustrated embodiment) be supplied to instruction execution unit 50 for execution.

In the FIG. 1 embodiment, the instruction from memory 40 to be executed at any given time is the instruction that has associated with it the highest priority value, rather than the instruction pointed to by a program counter. Unlike a conventional machine wherein the instruction set is an abstraction, and a program memory holds various routines with instructions stored in a particular order, instruction set memory 40 holds codes identifying all the instructions in the instruction set of execution unit 50 and without requiring any particular order. The architecture offers a context changing alternative which is different from polling operations and interrupt methodologies. The architecture occupies a middle ground between conventional computers and neural networks, but can include them as components and external processor blocks such as 65 as well.

Instruction execution unit 50 comprises an instruction register IR1 70 coupled to instruction memory 40, priority processing unit 20, and an instruction decoder 80. An instruction in instruction memory 40 that is to be executed is fed to IR1 70. An instruction in IR1 70 is then executed by the rest of instruction execution unit 50. In the illustrated embodiment, an instruction in IR1 70 is executed through decoder 80, a sequencer 100, a microcode store memory 105, an arithmetic logic unit ALU1 110, operational hardware 120 (such as a peripheral port), accumulator 130, and multiplexer 140. Decoder 80 is coupled to sequencer 100, operational hardware 120, ALU1 110, and microcode store memory 105 supplied with a clock signal CLK. ALU1 110 has an output coupled to accumulator 130 and ALU inputs supplied by multiplexer 140. MUX 140 selectively couples its inputs to either or both of ALU1 110 operand inputs. Operational hardware 120 is further coupled to accumulator 130, address and data bus 60, and to input/output unit 150. Multiplexer 140 has its inputs further coupled to accumulator 130, address and data bus 60, and priority processing unit 20. Bus 60 is advantageously separated into two buses 60A and 60B as desired by a bus interface 145 (IF).

Priority processing unit 20 comprises a priority program memory 160 addressed by a program counter 162 and an instruction register IR2 170. Priority program memory 160 is used to store programs for generation of priority values. Priority programs stored in priority program memory 160 are executed through the rest of processing unit 20. In the embodiment shown in FIG. 1, an instruction to be executed is sent from priority program memory 160 to IR2 170. Such an instruction is then executed through a decoder 180 supplying numerous output controls, a multiplexer 190, a CPU core having an arithmetic logic unit 200, an address generation unit 210, and an accumulator or core data register file 220. Unit 20 further has a multiplexer 250, program counter PC 162, multiplexer 270, a PC stack 280, a clock 290 and a PC incrementer 295.

IR2 170 is coupled to decoder 180 and supplies immediate addresses to multiplexer 250. Decoder 180 is further coupled to control multiplexer 250, and load processor instruction register IR1 70 from instruction set memory 40. Multiplexer 190 is further coupled to ALU 200 and MUX 190 is fed by bus 60A, a timer unit 300 and immediates from IR2 via decoder 180. Core 200 and ACC 220 are further coupled to priority memory 30 and address and data bus 60 through data communication lines 230. Core 200 is connected to other circuits, such as a control parameter unit 310 and I/O circuits 150 and 155. An address generation unit (AGU) 210 of core 200 is coupled to address and data bus 60 and priority memory 30 through address lines 240.

Multiplexer 250 has inputs further coupled to program counter 162, bus 60A, IR2 170, accumulator 130 in the instruction processor 50, and priority program instruction decoder 180. Program counter 162 supplies address inputs to priority program memory 160, and is fed by a multiplexer 270, and to push and pop stack registers 280. Multiplexer 270 has inputs further coupled to incrementer 295 and multiplexer 250.

Priority processing unit 20, by executing a priority program stored in priority program memory 160, generates priority values, and outputs those priority values to be stored in priority memory 30. Priority processing unit 20 addresses the appropriate priority memory location within priority memory 30 through address lines 240, and outputs those priority values through data lines 230.

Priority processing unit 20 not only generates priority values and stores them in priority memory 30, but priority processing unit 20 also reads the priority values stored in priority memory 30 to determine, at any given time, which instruction has the highest priority value. Priority processing unit 20 then causes that instruction to be executed by instruction execution unit 50. Note that if all instructions have priority such as zero or negative, the circuitry is suitably arranged to have unit 50 do nothing. This provides a no-operation or WAIT feature.

A priority program stored in priority program memory 160 may cause priority values to be generated based on a plurality of sources of information, or on no external information at all. For example, a priority program could assign a priority of zero (i.e., an instruction with a zero priority value will not be executed) to all instructions except for the instruction in instruction memory 40 to be executed. As soon as that instruction has been executed, a priority program in priority program memory 160 could assign the value of zero to the priority of that instruction and assign a non-zero priority value to the next instruction to be executed. Since such a priority program amounts to making memory 40 do step-by-step processing and could be used within the architecture shown, the architecture comprehends such step-by-step processing as a special case. However, in the present embodiment, the architecture is optimized for control of numerous competing processes. Therefore, a priority program may generate non-zero priority values and store them in priority memory 30 corresponding to a plurality of instructions stored in instruction memory 40. Such a priority program may generate priority values as a function of a plurality of factors. With such a priority program, the next instruction of instruction memory 40 to be executed is based not on a rigid and ordered program, but rather on the conflicting needs of, e.g., processes controlled by processor 10.

Priority values may be assigned based on information from devices controlled by processor 10, such as peripheral devices 153 and 157 connected to I/O interfaces 150 and 155, which are connected to address and data bus 60. The controlled devices can be, e.g., relays, solenoids, radiant energy emitters, sound emitters, computers, or other controllable elements whatever for industry, office, of home use for any useful application. Other information on which priority processing unit 20 may generate priority values may be stored in RAMs 330 and 335, which are connected to address and data bus 60. Information in RAMs 330 and 335 suitably come from any of a myriad of peripheral devices, such as clocks, A/D converters, transducers (responsive to any physical variables) 151 and 159, information data bases, and other computer systems 65. Priority values may also be determined as a function of already established priority values. Thus, priority processing unit 20 may read priority values from priority memory 30, using address lines 240 and data lines 230.

A timer unit 300 is provided for priority processing unit 20 to provide timing information for use in generating priority values. Timer unit 300 is controlled by decoder 180, feeds output to multiplexer 190, runs off clock 290, and can also be loaded or read on address and data bus 60. Timer unit 300 has a series of registers and counters to record elapsed time or countdowns to deadlines of activities of various processes controlled by processor 10. These registers are addressable via bus 60A by an address decoder in timer unit 300.

Priority processing unit 20 is suitably coupled to control parameter unit 310 via bus 60A. Control parameter unit 310 is thereby coupled to core 200, multiplexer 250, RAM 335, register file 220 and all other blocks to which bus 60 is connected. Bus 60 information including information from units 10, 30, 40, 50, 310, RAMs, I/O units and processor 65 are selectively fed to I/O and display unit 320 by user friendly operation and monitoring display software. Control parameter unit 310 generates monitoring and control parameters. Examples of the parameters are production in units per hour, instructions per second, fuel efficiency and other measurements. Some of the parameters may even have as their analogy human emotions as disclosed in U.S. Pat. No. 4,041,617 of the present inventor, which is hereby incorporated by reference. Instructions in instruction memory 40 may be analogized to decisions, and therefore execution of one instruction may affect other instructions' priorities (analogous to multiattribute utilities). By measuring and evaluating the relationships between the priorities of different instructions, control parameter unit 20 may be used to evaluate the efficiency and operation of a processor using the architecture of the present invention, and may be used to feed back to priority processing unit 20 information for RAM 335 on how to revise priority values.

Control parameter unit 310, for example, may measure the degree of intertask conflict present in processor 10. The emotion analog to such a measure would be tension. Tension is suitably determined from a scan of priority memory 30 as the magnitude of the priority (decisional influence) or priorities that do not prevail in the decision outcome. Put another way, tension is a function of the priorities in memory 30 of instructions in memory 40 that have priority significance but are currently unexecuted. For example, the higher the degree to which activities performed by processor 10 have conflicting priorities, the higher the tension value calculated by the control parameter unit 310 would be. Such a measure may be transmitted to I/O and display 320 for use in analysis of processor 10. Control parameters generated by control parameter unit 310 are supplied to RAM 335 for use by priority processing unit 20 as factors used in the generation of priority values. For example, if processor 10 experiences significant intertask priority conflicts, such that a control parameter such as tension has a high value, priority processing unit 20 is suitably caused to generate different priorities than if there was no, or less, intertask priority conflict.

In various embodiments, control parameter unit 310 is implemented as an additional core like CPU core 200 under control of decoder 180, or as an additional processor with its own software, or is merely provided as further software included in memory 160.

Figure 2:
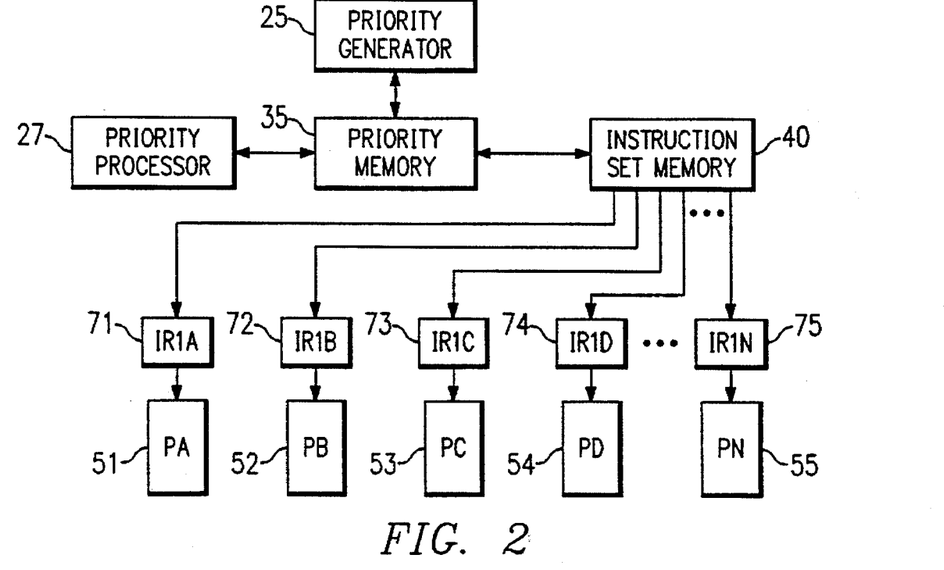
FIG. 2 is a block diagram showing the architecture of another embodiment of the present invention implemented with a plurality of execution units.

Referring to FIG. 2, another embodiment supports parallel processors. In FIG. 2, the functions of unit 10 of FIG. 1 are divided between separate processors, software or circuits 25 and 27. As indicated, priority generator 27 continually updates priority values and loads them into priority memory 35. Priority processor 27 continually performs a maximum calculation on the current contents of priority memory 35 so that the instruction in instruction memory 40 with the highest priority at any given time will be outputted to instruction register IR1A 71. Another instruction with the same priority or the second highest priority is simultaneously output (or soon after output of the highest priority instruction) to instruction register IR1B 72. In the same fashion, other high priority instructions may be outputted to instruction registers IR1C 73, IR1D 74, and IR1N 75. As can be seen, a plurality of instruction registers may be used with the architecture of the present invention. Associated with each instruction register are instruction execution units PA 51, PB 52, PC 53, PD 54, and PN 55, each analogous to instruction execution unit 50 in FIG. 1, for execution of an instruction in each instruction register. This arrangement of FIG. 2 supports processes which have some indivisible parallel tasks, or wherein priorities are uncommensurable or not readily subordinated.

Many different algorithms may be used to determine which instructions are to be processed in the parallel configuration shown in FIG. 2. Examples of such algorithms include processing the N highest priority instructions, processing a number M of highest priority instructions and others (N−M) with the highest increasing rates of change of priority (to the extent that enough parallel instruction registers exist), first-in-first-out processing (priority based upon last time of execution), last-in-first-out processing, and class-processing (wherein "classes" of instructions are established, and a predetermined (n=1 or more) highest priority instructions within each class are processed).

Figure 3:
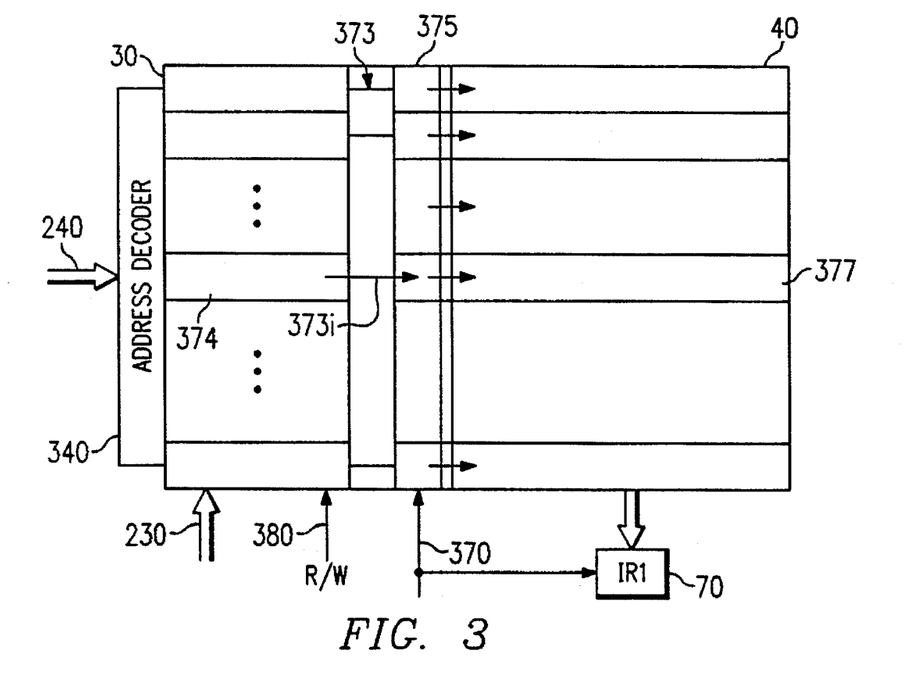
FIG. 3 is a block diagram showing a priority memory and instruction memory of a preferred embodiment.

Referring to FIG. 3, a more detailed block diagram of instruction memory 40 and priority memory 30 is schematically illustrated. Priority values are read from and written (outputted) to priority memory 30 from priority processing unit 20. Particular memory locations within priority memory 30 are respectively associated with particular corresponding instructions in instruction memory 40. For reading or writing particular priority values in priority memory 30, priority processing unit 20 addresses that particular priority memory location within priority memory 30 through address lines 240. An address decoder 340 decodes addresses on address line 240 for access to particular addresses within priority memory 30. Data representing the priority values are read from or written to particular addressed memory locations within priority memory 30 through data bus 230. Read/write line 380 may be activated by priority processing unit 20 to initiate read or write operations in priority memory 30.

Priority processing unit 20 of FIG. 1 or priority processor 27 of FIG. 2 determines which instruction in instruction memory 40 is selected depending on priority values in memory 30 associated with each such instruction. In one circuit approach, core 200 has a register in the AGU to hold the address of the priority value in memory 30 which is the highest. A line 370 is activated and that address operates address decoder 340 in a mode whereby decoder 340 accesses the memory 40 (and not memory 30) to send the instruction to IR1 that corresponds to that highest priority value in memory 30.

In a second circuit approach, when priority processing unit 20 or 27 has determined which priority value is the highest, that priority value is output from unit 20 on data bus 230 to memory 30. Concurrently, line 370 as an associative enable/disable is activated. Associative enable/disable 370, as shown in FIG. 3, is coupled to priority memory 30 and IR1 70. When associative enable/disable 370 is activated, priority memory 30 in this second circuit approach has associative (or content-addressable) memory cells (conventionally used in cache tags circuits) to find a match. The location 374 that matches activates a line 373 to memory 40 that activates the instruction 377 associated with the particular priority memory location 374 containing the matching priority value on data bus 230. That instruction 377 is output from memory 40 to IR1 70, which is also coupled to associative enable/disable 370. Associative enable/disable 370, therefore, operates to cause the instruction associated with the priority memory location containing the highest priority value at any one time to be output and entered into IR1 70, which, as discussed in FIG. 1, holds the instruction to be executed by the rest of instruction execution unit 50. If more than one memory location in priority memory 30 contains the same priority value output on data bus 230 when the associative enable/disable 370 signal is activated, the instruction associated with the lowest address in priority memory 30 will be processed first in one embodiment. Any suitable logic 375 is implemented to determine which instruction will be outputted to IR1 70 when more than one memory location in priority memory 30 contains the same priority value held on data bus 230.

Priority memory 30 may also be configured as a two-dimensional array. In such a configuration, several instructions may be associated with a "field". As the priority value for that field changes, so does the priority value for each instruction in that field. In this fashion, the priorities of several instructions may be changed by changing only the priority of the field.

Figure 4A:
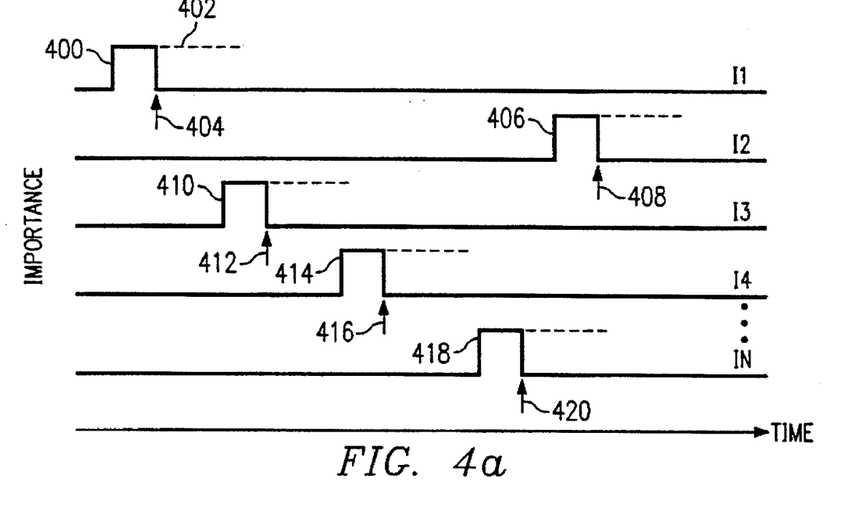
FIGS. 4a and 4b are time graphs showing representative priority values of various instructions.

FIG. 4a is a graph showing the importance of various instructions I1, I2, . . . IN, in instruction set memory 40 as a function of time. In FIG. 4a, importance is synonymous with priority value. The graph for instruction I1 illustrates possible priority values associated with I1.

At event 400, priority processing unit 20 determines that the priority value for instruction I1 is non-zero. Upon execution of instruction I1, event 404, priority processing unit 20 determines that the priority value to be associated with instruction I1 is now equal to zero, indicating that instruction I1 does not need to be executed until such time as priority processing unit 20 again determines that a non-zero priority value is appropriate for instruction I1. Furthermore, priority processing unit 20 determines that the priority value associated with instruction I1 should drop to zero (event 404) upon some other event or determination. Depending upon the priority program in priority program memory 160, the priority value may remain non-zero even after execution of instruction I1, as indicated by dashed line 402.

Similarly, FIG. 4a shows the priority of various other instructions, such as instruction I2. At event 406, priority processing unit 20 determines that the priority value for instruction I2 is non-zero. Upon execution of instruction I2, or upon some other determination of priority processing unit 20, the priority value associated with instruction I2 drops to zero, event 408. Likewise, the priority value for instruction I3 will rise to some non-zero number, event 410, and drop again to zero, event 412, either upon execution of instruction I3 or some other determination made by priority processing unit 20. The same is true of other instructions, such as instruction I4 or instruction IN, where priority processing unit 20 will determine that the priority for such instructions is to be non-zero, events 414 and 418, and then the priority for those instructions should drop to zero based on either execution of the instructions or upon some other occurrence determined by priority processing unit 20, events 416 and 420. Since only one instruction has nonzero priority at a time in FIG. 4a, their order of execution is I1, I3, I4, IN, I2 in this special case example.

Figure 4B:
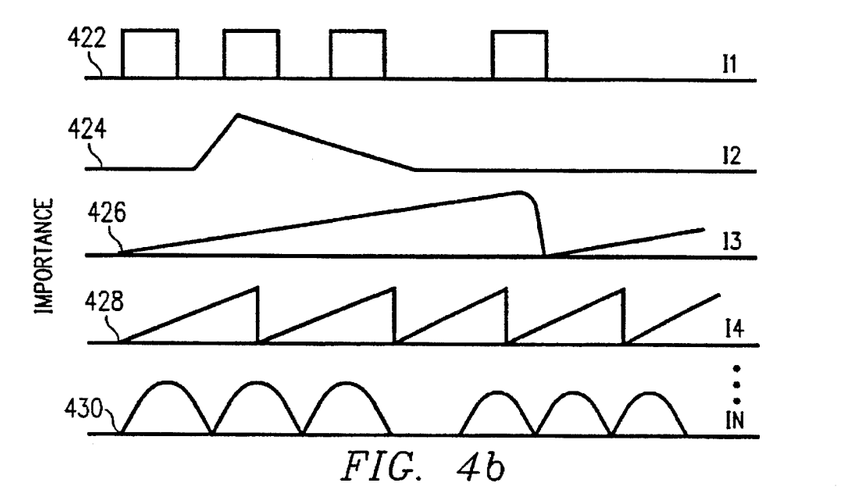

FIG. 4b shows other possible priority values associated with different instructions stored in instruction memory 40. Line 422, indicating the priority value for instruction I1, shows an example of priority values which rise to some non-zero level upon some event, and then remain at that level until such time as the instruction is executed or some event occurs which causes priority processing unit 20 to drop the priority associated with that instruction to zero. For example, if instruction I1 were controlling an emergency relief valve to a pressure vessel, the priority of instruction I1 might rise if the tank pressure gets close to some maximum set point. The pressure in the tank could be relieved and the priority value accordingly drop either by execution of instruction I1, (opening the pressure relief valve), or, for example, because some other valve to the tank not controlled by instruction I1 has opened and caused a drop in the pressure of the tank. In this example, software forces the priority to zero after each instruction execution. However, the pressure remains high and regenerates the priority until the instruction is repeatedly executed as shown.

Line 424 of FIG. 4b shows priority values that could be associated with some instruction, such as instruction I2. As can be seen, at line 424, the priority rises and falls incrementally. Again referring to the example of a pressure tank as a boiler, priority processing unit 20 may assign increasing priority values to instruction I2 based on the temperature within the tank. Thus, as the tank temperature increases towards some maximum set point, the priority value associated with instruction I2 also increases. At the point where a hypothetical fuel valve controlled by instruction I2 opens, the priority of instruction I2 may decrease along with the temperature of the tank, until such time as the priority value associated with instruction I2 is zero because the temperature of the tank has reached some safe operating level.

Line 426, representing the priority value of instruction I3, illustrates the possible priority values assigned to instruction I3 which slowly increase and rapidly drop off after some event. Instruction I3 could be used to control a cooling water valve associated with some heated vessel. Priority processing unit 20 may assign priority values related to temperature as illustrated by line 426 to control the temperature of the vessel.

Line 428 of FIG. 4b illustrates priority values that may be assigned to some instruction, such as instruction I4, that have sawtooth wave-like characteristics. An example of a situation that could give rise to the sawtooth wave of line 428 is a timed process that requires some action in a given set of time. For example, if the temperature in a tank needed to be measured or read periodically, a timer unit, such as timer unit 300, may keep track of elapsed time between temperature readings. Priority processing unit 20 may assign increasing priority values as the elapsed time increases. Once the elapsed time reaches some value, and accordingly the priority also reaches some value, instruction I4 may be executed to read the temperature of the tank. Upon execution of instruction I4, the timer unit is reset, as is the priority value for instruction I4. This process then repeats itself over and over.

Referring now to line 430, illustrated is the case where the priority values for some instruction, instruction IN, rise and fall sinusoidally in time, with a piston journaled on a crankshaft, for example.

FIGS. 4a and 4b provide various examples of how priority values associated with different instructions may rise and fall, depending on the purpose of the instructions of instruction memory 40 and the priority program that resides in priority program memory 160. Thus, as shown in connection with lines 424–430, priority values may be non-binary, i.e., they may take on a wide range of values—not merely "1" or "0" or "ON" or "OFF". These examples are merely illustrative, and one skilled in the art would recognize that many other examples are possible through use of the present invention, depending upon processes controlled by processors implementing the present invention, and depending upon different priority programs stored in priority program memory 160.

It is emphasized that the example of industrial process task management is but one example and that tasks that range from high level task control to medium and low level computer instructions or tasks are all contemplated as examples of task applications.

Figure 5:
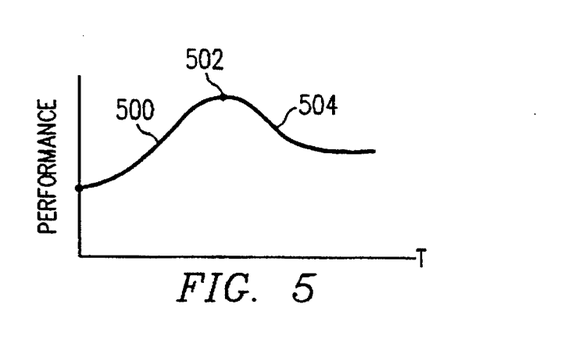
FIG. 5 is a graph showing performance efficiency as a function of a measure of intertask conflict, mnemonically designated "tension".

Referring now to FIG. 5, a graph of the performance of a system utilizing the architecture of the present invention is illustrated as a function of the tension of the system. As discussed previously, control parameter unit 310 may be used to measure the level of intertask conflicts, or tension, experienced by a system utilizing the present invention. As shown in FIG. 5, the efficiency of a system experiencing low tension is relatively low. As the level of tension rises, rise 500, the efficiency of the system increases, as more and more functions are executed to relieve the intertask conflicts. As tension increases further, the efficiency of the system decreases, decrease 504, as the system is unable to cope with the increasing level of intertask conflicts. In the present system, control parameter unit 310 may be utilized to measure the tension of the system, and may be used by the priority program stored in priority program memory 160 to alter the process by which priority values are generated based upon the recognized tension of the system.

In a fuzzy-set-based microcontroller embodiment, execution unit 50 is replaced with a unit for executing operations in fuzzy set mathematics. In such operations, data representing fuzzy variables such as "cool", "warm", "very hot", "fast", "slow" and the like, have a spectrum of fuzzy set membership values between zero and one. These values are processed by fuzzy logic operations that perform OR as a maximum of the membership values associated with the OR-ed variables. AND is executed as a minimum of membership values associated with AND-ed variables. NOT is executed as the complement (unity less membership value) of a given fuzzy variable. Examples of fuzzy-set data execution units have digital circuitry and others have analog circuitry with analog levels to represent the fuzzy variables.

Advantageously, the association herein of priority memory with instruction memory confers what are herein called "fuzzy instructions" on a computer. The fuzzy instructions are executed on either execution units of the crisp data type (e.g., 50 of FIG. 1) or the fuzzy data type, or both.

Priority-driven processors of the type of FIG. 1 or FIG. 2 are suitably substituted recursively for blocks such as 10, 50, 310, 150 of FIG. 1 or blocks 25, 27, and 51 of FIG. 2 to form even more versatile embodiments.

Integrated circuits such as the Texas Instruments TMS-7000 and TMS-370 microcontrollers can be used or adopted as circuit modules for circuits 20 and 50 of FIG. 1. The TMS-320 digital signal processors and TMS-340 graphics signal processors can also be used or adapted as modules alone or in combination with the microcontroller circuits and integrated as modules on a single IC chip in a preferred embodiment. See U.S. Pat. Nos. 4,577,282; 4,432,052; 4,912,636; 5,072,418; and 4,933,878, assigned to the present assignee and incorporated herein by reference.

A few preferred embodiments have been described in detail hereinabove. It is to be understood that the scope of the invention also comprehends embodiments different from those described, yet within the scope of the claims.

For example, color display devices can be raster-scanned cathode ray tubes or other raster-scanned devices; devices that are not raster-scanned and have parallel line or frame drives; color printers, film formatters, or other hard copy displays; liquid crystal, plasma, holographic, digital micromirror, or other displays of non-CRT technology; or three-dimensional or other devices using nonplanar image formation technologies.

"Microcomputer" in some contexts is used to mean that microcomputer requires a memory and "microprocessor" does not. The usage herein is that these terms can also be synonymous and refer to equivalent things. The phrase "processing circuitry" comprehends ASICS (application specific integrated circuits), PAL (programmable array logic), PLAs (programmable logic arrays), decoders, memories, non-software based processors, or other circuitry, or digital computers including microprocessors and microcomputers of any architecture, or combinations thereof. Words of inclusion are to be interpreted as nonexhaustive in considering the scope of the invention.

Internal and external connections can be ohmic, capacitive, direct or indirect, via intervening circuits or otherwise. Implementation is contemplated in discreet components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware. Process diagrams are also representative of flow diagrams for microcoded and software based embodiments.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A processor, comprising:
   an instruction set memory operable to store a plurality of instructions representing an instruction set that are independent of order of execution;
   a priority memory coupled to said instruction memory and operable to store a plurality of priority values corresponding to respective ones of the instructions;
   an instruction execution unit coupled to said instruction set memory and operable to execute said instructions as a function of said priority values;
   a priority processing unit coupled to said priority memory and operable to generate said priority values and to output said priority values to said priority memory, wherein said priority processing unit comprises:
      a priority program memory operable to store a priority program operable to determine said priority values; and
      a processing unit coupled to said priority memory and operable to execute said priority program to determine said priority values.

2. The processor of claim 1, wherein said priority memory comprises a plurality of memory locations, each of said memory locations associated with at least one of said instructions stored in said instruction memory.

3. The processor of claim 1, further comprising a control parameter unit coupled to said priority processing unit and operable to generate control parameters for controlling said processor's performance.

4. The processor of claim 3, wherein said control parameters comprise measures of said processor's efficiency.

5. The processor of claim 1, further comprising:
   at least one peripheral device coupled to said priority processing unit; and
   a timer unit coupled to said priority processing unit operable to time responses of said at least one peripheral device and to generate timing information to be used by said priority processing unit in determining said priority values.

6. The processor of claim 1, further comprising:
   at least one peripheral device coupled to said priority processing unit, and operable to read data from said at least one peripheral device and to determine said priority values as a function of said data.

7. The processor of claim 1, further comprising:
   a control parameter unit coupled to said priority processing unit operable to generate control parameters for controlling said processor's performance;
   at least one peripheral device coupled to said priority processing unit;
   a timer unit coupled to said priority processing unit operable to time events and responses of said at least one peripheral device and to generate timing information to be used by said priority processing unit in determining said priority values; and
   said priority processing unit being further operable to read data from said at least one peripheral device and determine said priority values as a function of said data.

8. The processor of claim 7, wherein said control parameters comprise measures of said processor's efficiency.

9. The processor of claim 1, further comprising an input/output data port coupled to said instruction execution unit.

10. A processor, comprising:
    an instruction set memory operable to store a plurality of instructions;
    a priority memory operable to store a plurality of priority values;
    an instruction execution unit coupled to said instruction memory operable to execute said instructions;
    a priority processing unit coupled to said priority memory operable to determine which of said instructions stored in said instruction memory are to be executed as a function of said priority values stored in said priority memory, said priority processing unit is further operable to generate said priority values corresponding to respective ones of said instructions and to output said priority values to said priority memory; and
    wherein said priority memory comprises a plurality of content-addressable memory locations, each of said memory locations associated with at least one of said instructions stored in said instruction set memory and responsive to a priority value from said priority processing unit to sense a match to initiate output of an instruction from said instruction set memory to said instruction execution unit.

11. The processor of claim 10, further comprising a processing unit operable to generate said priority values for said priority memory.

12. The processor of claim 10, wherein said priority memory comprises an address decoder coupled to said priority memory and to said priority processing unit and operable to decode an address signal of at least one of said plurality of memory locations for both said priority memory and said instruction set memory, said address signal generated by said priority processing unit.

13. The processor of claim 10 further comprising:
    an associative enable/disable line coupled to said priority processing unit, said priority memory, and said instruction execution unit, and operable to initiate at least one of said instructions associated with at least one of said priority values to be output from said instruction set memory to said instruction execution unit.

14. The processor of claim 10, further comprising a control parameter unit coupled to said priority processing unit and operable to generate control parameters for controlling said processor's performance, wherein said control parameters comprise measures of said processor's current level of intertask conflict.

15. The processor of claim 10 and further comprising:
    at least one peripheral device; and
    a timer unit coupled to said priority processing unit and operable to time responses of said at least one peripheral device and to generate timing information to be used by said priority processing unit in determining said priority values.

16. The processor of claim 10, further comprising at least one peripheral device, and said priority processing unit operable to read data from said at least one peripheral device and determine said priority values as a function of said data.

17. The processor of claim 10, and further comprising:
    a control parameter unit coupled to said priority processing unit operable to generate control parameters to be used for controlling said processor's performance;
    at least one peripheral device;
    a timer unit coupled to said priority processing unit and operable to time events and responses of said at least one peripheral device and to generate timing information to be used by said priority processing unit in determining said priority values; and
    said priority processing unit being further operable to read data from said at least one peripheral device and determine said priority values as a function of said data.

18. The processor of claim 17, wherein said control parameters comprise repeatedly updated measures of said processor's efficiency on current tasks.

19. The processor of claim 10 and further comprising an input/output data port coupled to said instruction execution unit and said instruction execution unit has a microprogram memory responsive to said instruction set memory.

20. A method of processing instructions, comprising the steps of:
    storing a plurality of instructions;
    storing a plurality of priority values associated with said plurality of instructions;
    storing a priority program to be used for determining said priority values;
    determining said priority values based on said priority program;
    determining which of said stored instructions is to be executed as a function of said priority values; and
    responsive to said step of determining, executing said instruction.

21. The method of claim 20, and further comprising the steps of:
    determining said priority values to be assigned to each of said instructions; and outputting said priority values.

22. The method of claim 21, and further comprising the steps of:

generating control parameters for evaluating said method's performance;

communicating with at least one peripheral device;

timing events and responses to said at least on peripheral device and generating timing information to be used in determining said priority values; and reading data from said at least one peripheral device and determining said priority values as a function of said data.

23. The method of claim 22, and further comprising the step of determining said priority values as a function of said control parameters.

24. The method of claim 20, and further comprising the step of generating control parameters for controlling said method's performance.

25. The method of claim 24, and further comprising the step of determining said priority values as a function of said control parameters.

26. The method of claim 20, and further comprising the steps of:

communicating with at least one peripheral device; and timing responses of said at least one peripheral device and generating timing information to be used in determining said priority values.

27. The method of claim 20, and further comprising the steps of:

communicating with at least one peripheral device and;

reading data from said at least one peripheral device and determining said priority values as a function of said data.

28. The method of claim 20 and further comprising the step of assigning at least one predetermined memory location to at least one field of said instructions, such that at least one of said priority values is associated with said at least one field of instructions.

* * * * *